Patented Jan. 28, 1941

2,229,813

UNITED STATES PATENT OFFICE 2,229,813

PROCESS FOR THE MANUFACTURE OF $\Delta^{4,5}$-UNSATURATED 3-KETONES OF THE SEXUAL HORMONE SERIES Karl Miescher, Riehen, and Albert Wettstein, Basel, Switzerland, assignors, by mesne assignments, to Ciba Pharmaceutical Products, Incorporated, Summit, N. J., a corporation of New Jersey No Drawing. Application May 3, 1938, Serial No. 205,780. In Switzerland June 3, 1937

4 Claims. (Cl. 260—397)

It has been found that $\Delta^{4,5}$-unsaturated 3-ketones of the sexual hormone series can be obtained by causing agents capable of splitting off HX to react with compounds of this series which contain in the nucleus A—B one of the atom groupings

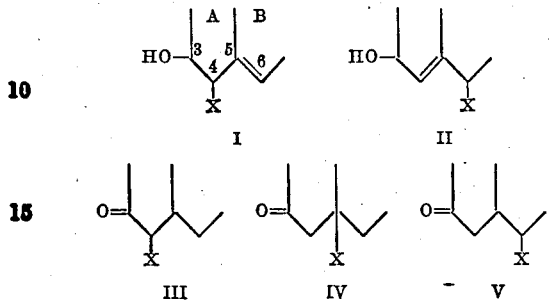

in which X stands for a free, esterified or etherified hydroxyl group.

Among compounds of the sexual hormone series having the above named grouping there are to be understood compounds of the type of male and female hormones, of the corpus luteum hormone and of the suprarenal cortical hormones, that is to say derivatives for example of aetio-cholane, hexahydro-estrone, pregnane and their stereoisomerides.

Thus the following bodies are examples of suitable parent materials: $\Delta^{5,6}$-androstentriols-(3:4:17), $\Delta^{4,5}$-androstentriols-(3:6:17), $\Delta^{5,6}$-3:4-dioxy-androstenones-(17), $\Delta^{4,5}$-3:6-dioxy-androstenones-(17), 4-, 5- or 6-oxy-androstandiones-(3:17), 4-, 5- or 6-oxy-androstanol-(17)-ones-(3), 3,5,6-trioxy-androstanones-(17), 3:5:6:17:-tetroxy-androstanes and their derivatives and stereoisomerides, also compounds which correspond in respect of ring A and B with those named but have at the carbon atom 17 of the ring D, for example the groupings:

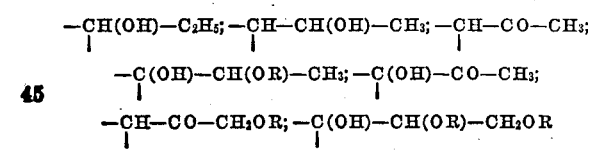

or the like, for instance $\Delta^{5,6}$-3:4:17:20:21-pentoxy-pregnenes, $\Delta^{4,5}$-3:6:17:20:21-pentoxy-pregnenes, $\Delta^{5,6}$-3:4:11:17:20:21-hexaoxy pregnenes, 3:5:6:17:20:21-hexaoxy-pregnanes, 3:5:6-trioxy-pregnanones-(20) or their derivatives. Some of the aforesaid parent materials are made by the action of selenium dioxide on $\Delta^{5,6}$- or $\Delta^{4,5}$-3-oxy-compounds which, if desired, may have carbonyl groups in the side chains. They may further be obtained for example by splitting off hydrogen halide from 3-oxy-5:6-dihalogen compounds. Others may be prepared by the addition in pairs of hydroxyl groups to the $\Delta^{4,5}$- or $\Delta^{5,6}$- unsaturated compounds, in which case hydroxyl groups may also be added to any existing double unions in the side chain. As already mentioned above, the group X in the parent materials may also be an esterified or etherified hydroxyl group so that one may start for example from benzoic acid esters, palmitic acid esters, acetic acid esters and occasionally from xanthic acid esters or also from triarylmethyl ethers, phenolates and the like.

Finally, one may also start from other compounds of the sexual hormone series which under the working conditions of the elimination of HX can produce intermediately the above atom groupings, as is the case for example with 3,4,5-, 3,4,6- or 3,5,6-trioxy compounds.

The elimination of HX takes place with agents which, as is known, are suitable for such reactions (cf. for example Houben "Die Arbeitsmethoden der organischen Chemie," 3rd edition, vol. 2, pages 947 et seq.). The parent materials may be dehydrated for example by the action of mineral acids, frequently in alcohols or dioxane, of phosphorus-oxy-chloride, bisulfates, formic acid, oxalic acid or acid anhydrides, such as acetic acid anhydride, phosphorus pentoxide, by the action of catalysts, such as iodine, of raised temperature in indifferent gases or under diminished pressure. Also the elimination of the ester or ether radicals (carboxylic acids, alcohols, phenols) is often advantageously conducted thermally and in a vacuum. Moreover, the known suitable agents may be used for this elimination. In addition to the elimination of water or ester or ether groups in the rings A and B an analogous reaction may also happen at other points of the molecule, for instance hydroxyl groups may be eliminated in the form of water at $C_{17}$ and $C_{11}$. In special cases of a side chain

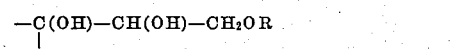

(R=hydrogen, acyl or hydrocarbon radical) one obtains in this manner ketols of the formula

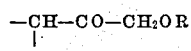

The products of the process, for example androstendione-(3,17), androstenol-(17)-one-(3), pregnendione-(3,20), 11,21-dioxy-pregnendione-(3,20), 21-oxy-pregnendione-(3,20) or their derivatives, are therapeutically valuable compounds or may be converted into such.

The following examples illustrate the invention, the parts being by weight:

Example 1

1 part of $\Delta^{5,6}$-androstentriol-(3,4,17) of melting point 254–255° C., 70 parts of alcohol and 3 parts of concentrated hydrochloric acid are boiled together under reflux for 15 minutes. The whole is poured into water, extracted with ether, the etherial solution washed with water, bicarbonate solution and water, dried and evaporated in a vacuum. From the residue there is obtained by direct recrystallisation from hexane, isopropyl ether or ethyl acetate or by intermediate conversion into the sparingly soluble semicarbazone, the $\Delta^{4,5}$-androstenol-(17)-one-(3) of melting point 154.5–155.5° C. and of the formula

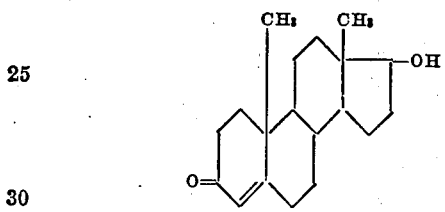

The same compound is obtained in similar manner from $\Delta^{4,5}$-androstentriol-(3,6,17). Also by heating 3,5,6,17-tetroxy-androstane with potassium bisulphate in a vacuum $\Delta^{4,5}$-androstenol-(17)-one-(3) is obtained.

Example 2

2 parts of a mixture of $\Delta^{5,6}$-3,4-dioxy-androstenone-(17) and $\Delta^{4,5}$-3,6-dioxy-androstenone-(17), as obtained by the action of selenium dioxide on trans-dehydro-androsterone, are mixed with 100 parts of alcohol and 5 parts of sulphuric acid of 30% strength and the mixture is boiled under reflux for 20 minutes. The whole is then poured into water, extracted with ether, the etherial solution washed with water, dried and evaporated in a vacuum. From the residue there may be obtained by direct recrystallisation or by the intermediate formation of a sparingly soluble disemicarbazone $\Delta^{4,5}$-androstendione-(3,17) of melting point 173–174° C. and of the formula

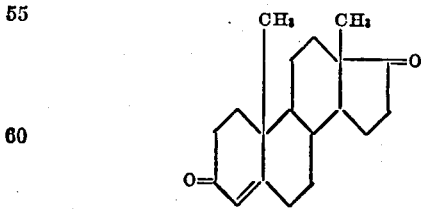

Example 3

The benzoate obtained from 4-oxy-pregnandione-(3,20) of melting point 156–158° C. by the action of benzoylchloride in pyridine is heated in a high vacuum until almost the whole of the substance has sublimed. The colourless sublimate is dissolved in hexane and the solution is washed for separating benzoic acid by means of an aqueous solution of bicarbonate; it is then dried and evaporated, whereby there is obtained directly or by intermediate conversion into the very sparingly soluble disemicarbazone $\Delta^{4,5}$-pregnendione-(3,20) of the formula

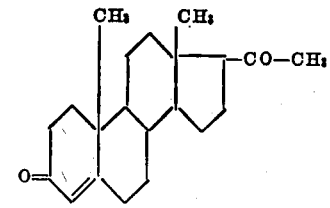

This body recrystallises from hexane in dimorphous forms which melt at 120 and 129° C. respectively.

In an analogous manner this pregnendione may be obtained from 6-benzoxy-pregnandione-(3,20) by thermal elimination of benzoic acid as well as from 3,5,6-trioxy-pregnanone-(20) by dehydration by means of potassium bisulphate.

Example 4

1 part of the mixture of $\Delta^{5,6}$-3,4,17,20,21-pentoxy-pregnenes and $\Delta^{4,5}$-3,6,17,20,21-pentoxy-pregnenes which is obtainable by reaction of selenium dioxide on $\Delta^{5,6}$-3,17-dioxy-21-oxo-pregnene and final reduction is mixed with 100 parts of alcohol and 6 parts of concentrated hydrochloric acid, and the mixture is heated for half an hour at 60° C. and then precipitated by addition of water; it is extracted with ether, the etherial solution is washed with bicarbonate solution and water and then dried and evaporated. From the residue fractional crystallisation from dilute methanol, if necessary after removal of the diketone fraction by means of a carbonyl reagent, for instance basically substituted acetic acid hydrazide, yields $\Delta^{4,5}$-21-hydroxy-pregnendione-(3,20) of the formula

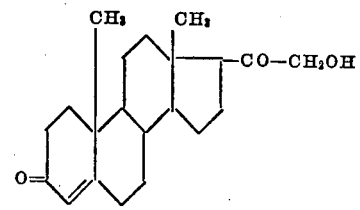

which melts at 139–141° C. and has a revival effect on rats from which the suprarenal capsules have been removed.

What we claim is:

1. A process for the manufacture of $\Delta^{4,5}$-unsaturated 3-ketones of the sexual hormone series, which comprises reacting a compound of this series containing in the nucleus A—B a grouping selected from the class consisting of

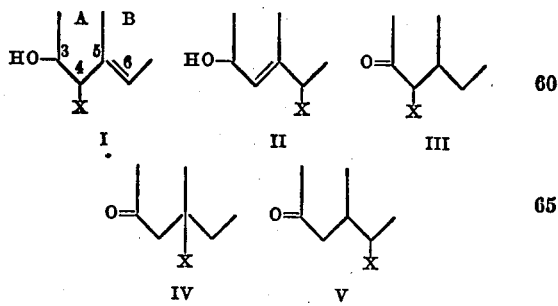

wherein X stands for a member of the group consisting of a free and an esterified hydroxyl group, with a member of the group consisting of water- and acid-eliminating agents.

2. A process for the manufacture of $\Delta^{4,5}$-unsaturated 3-ketones of the sexual hormone series, which comprises reacting a compound of this series containing in the nucleus A—B the grouping

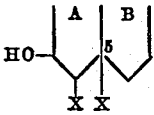

wherein X stands for a member of the group consisting of free hydroxyl and esterified hydroxyl, with a member of the group consisting of water- and acid-eliminating agents, whereby the said grouping is, in an intermediate stage, converted into the grouping

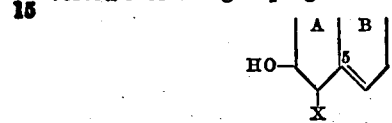

wherein X has the significance hereinbefore set forth, and is then converted into the grouping

3. A process for the manufacture of $\Delta^{4,5}$-unsaturated 3-ketones of the sexual hormone series, which comprises reacting a compound of this series containing in the nucleus A—B the grouping

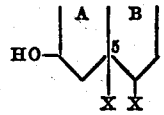

wherein X stands for a member of the group consisting of free hydroxyl and esterified hydroxyl, with a member of the group consisting of water- and acid-eliminating agents, whereby the said grouping is, in an intermediate stage, converted into the grouping

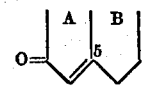

wherein X has the significance hereinbefore set forth, and is then converted into the grouping 4. A process for the manufacture of testosterone, comprising treating $\Delta^{5,6}$-androstentriol-(3,4,17) with a water-eliminating agent.

KARL MIESCHER.
ALBERT WETTSTEIN.